(12) United States Patent
Wittmaier et al.

(10) Patent No.: US 8,951,032 B2
(45) Date of Patent: Feb. 10, 2015

(54) DEVICE FOR PROCESSING A MATERIAL WEB USING ULTRASOUND AND HAVING A SUPPORT FOR THE SONOTRODE

(75) Inventors: Dennis Wittmaier, Vaihingen (DE); René Kostewa, Mainhardt (DE)

(73) Assignee: Schober GmbH Holding, Eberdingen (DE)

( * ) Notice: Subject to any disclaimer, the term of this patent is extended or adjusted under 35 U.S.C. 154(b) by 311 days.

(21) Appl. No.: 13/390,014

(22) PCT Filed: Jul. 26, 2010

(86) PCT No.: PCT/EP2010/060769
§ 371 (c)(1),
(2), (4) Date: Feb. 10, 2012

(87) PCT Pub. No.: WO2011/009959
PCT Pub. Date: Jan. 27, 2011

(65) Prior Publication Data
US 2012/0276236 A1  Nov. 1, 2012

(30) Foreign Application Priority Data

Jul. 24, 2009 (DE) .......... 10 2009 034 732
Jan. 13, 2010 (DE) .......... 10 2010 004 407

(51) Int. Cl.
*B29C 65/08* (2006.01)
*B23K 20/10* (2006.01)
*B26D 7/08* (2006.01)
*B29C 65/00* (2006.01)

(52) U.S. Cl.
CPC ......... *B23K 20/10* (2013.01); *B23K 20/106* (2013.01); *B26D 7/086* (2013.01); *B29C 65/086* (2013.01); *B29C 66/80* (2013.01); *B29C 66/8167* (2013.01); *B29C 66/83411* (2013.01); *B29C 66/9241* (2013.01); *B29C 66/92611* (2013.01); *B23K 2201/16* (2013.01); *B29C 66/7352* (2013.01)
USPC ....................................... 425/174.2

(58) Field of Classification Search
USPC ....................................... 425/174.2
See application file for complete search history.

(56) References Cited

U.S. PATENT DOCUMENTS

| | | | |
|---|---|---|---|
| 5,820,011 A * | 10/1998 | Ito et al. | 228/1.1 |
| 6,190,296 B1 | 2/2001 | Gnad et al. | |
| 6,336,803 B1 | 1/2002 | Funger et al. | |
| 2004/0050474 A1 * | 3/2004 | Kubik et al. | 156/64 |
| 2013/0284379 A1 * | 10/2013 | Patrikios et al. | 156/580.1 |

FOREIGN PATENT DOCUMENTS

| | | |
|---|---|---|
| DE | 198 13 121 C1 | 10/1999 |
| EP | 0 790 888 A2 | 8/1997 |
| WO | WO 96/14202 A2 | 5/1996 |

* cited by examiner

*Primary Examiner* — Ryan Ochylski
(74) *Attorney, Agent, or Firm* — Henry M. Feiereisen LLC

(57) ABSTRACT

A device for acting on a material web using ultrasonic includes an ultrasonic unit which has a converter a booster and a sonotrode, and a counter tool. The material web is guided through a gap between the sonotrode and the counter tool and acted upon by the sonotrode. The ultrasonic unit is adjustable relative to the counter tool by way of a movable carriage, and the booster is firmly connected to the carriage. A support supports at least one side surface of the sonotrode and guides the sonotrode in the longitudinal direction thereof.

8 Claims, 1 Drawing Sheet

DEVICE FOR PROCESSING A MATERIAL WEB USING ULTRASOUND AND HAVING A SUPPORT FOR THE SONOTRODE

CROSS-REFERENCES TO RELATED APPLICATIONS

This application is the U.S. National Stage of International Application No. PCT/EP2010106769, filed Jul. 26, 2010, which designated the United States and has been published as International Publication No. WO 2011/009959 and which claims the priorities of German Patent Applications, Serial Nos. 10 2009 034 732.1, filed Jul. 24, 2009, and 10 2010 004 407.5, filed Jan. 13, 2010, pursuant to 35 U.S.C. 119(a)-(d).

BACKGROUND OF THE INVENTION

The invention relates to a device for processing a material web including an ultrasonic unit having a converter, a booster and a sonotrode, and a counter tool, wherein the material web is guided through a gap between the sonotrode and the counter tool and is acted upon by the sonotrode, wherein the ultrasonic unit is adjustable via a movable carriage in relation to the counter tool and the booster is firmly connected to the carriage.

It is known to use ultrasonic sonotrodes in order to connect, cut, perforate, punch, stamp, heat treat, or treat in a similar way material webs. In the case of sonotrodes, it is critical that their tip is pressed or pushed onto the material web with an exactly predefined force so that the energy required for the procedure can be introduced into the material web. Because of the heat generated during the procedure, the length of the operating tool, for example a sonotrode, changes and can lead to a change in the gap height. A gap that is too narrow usually leads however to deterioration in processing the material and may at times result in damage to the material web or the tools, because the contact pressure is excessive and thus excessive energy is introduced into the material web. A gap that is too wide results in an unacceptable welding or cutting quality because the contact pressure is inadequate. It is therefore sought to maintain the contact pressure at a desired value as constant as possible.

A change in the operating speed, i.e. the throughput rate of the material web through the working gap necessitates a change of the contact pressure, because for example at an increase in speed, the required welding energy has to be introduced into the material web within a shorter time. In this case, the contact pressure therefore has to be increased.

EP 0 790 888 A1 relates to a device for machining a material web having the configuration as mentioned above. This device is intended to maintain a gap for machining the material web as constant as possible so that the reaction forces are completely supported by the rigid bearing when the material thickness differs during operation. Thus, the sonotrode does not yield. A disadvantage of this device is that different welding forces are introduced into the material to be welded when the material thickness varies while the gap height is constant, causing different welding qualities. Moreover, supporting the sonotrode in the oscillation node cannot always be realized in a simple manner.

SUMMARY OF THE INVENTION

The invention is therefore based on the object to provide an ultrasonic processing device that allows to more easily solve the above problems.

This object is solved by an operating device of the aforementioned type by providing a support which supports least one side surface of the sonotrode and guides the sonotrode in its longitudinal direction.

The essential difference to the state of the art is that the ultrasonic unit on one hand is not firmly connected to the machine stand but to the carriage. This has the significant advantage that the ultrasonic unit can be constantly shifted via the carriage and that the gap height can be constantly adjusted to the welding situation at hand, in particular to the material thickness etc. For this, a drive known per se, e.g. a servomotor with appropriate gear mechanism is provided to move the carriage on the machine stand. Moreover, it is not the sonotrode that is firmly clamped in the carriage but rather the booster, i.e. the amplitude transformation member is connected to the carriage. To prevent the sonotrode from having to absorb and support great transverse forces by itself, the sonotrode is supported by a support which bears on the sonotrode. Transverse forces are encountered during processing of strip material or continuous material when the latter is passed between the sonotrode and the counter tool. The counter tool can be configured as drum so that no transverse forces occur there. The sonotrode however is stationary with regard to the workpiece and bears on the workpiece with the welding load. Depending on the friction coefficient, this results in transverse forces that cannot be ignored. Because the sonotrode can be very long, these transverse forces create at the site of connection between sonotrode and booster and possibly also at the site of connection between booster and converter great bending torques which have to be absorbed by the connecting elements and transmitted.

According to one embodiment, the support supports the sonotrode perpendicular to the longitudinal direction thereof. This allows the transverse forces to be absorbed and dissipated without deflection.

In order to prevent interference with the ultrasonic welding, i.e. to not influence the welding loads or not to distort the welding frequency, the support and the sonotrode carry out movements relative to one another.

Preferably, the support bears linearly or flatly upon at least one side surface of the sonotrode. The support may also contact the sonotrode via several lines.

Advantageously, the support is force-neutral with regard to the sonotrode and does not introduce into the sonotrode forces which act in longitudinal direction of the sonotrode. This feature further contributes to prevent the welding loads and contact pressures acting on the workpiece from being interfered with or distorted. The welding loads generated via the ultrasonic oscillations are not influenced.

To avoid excessive wear and to prevent undesired heat development, the support is made of ceramics, invar-alloy, or hardened steel. These materials are very wear-resistant and, when appropriately lubricated, have a negligible friction coefficient relative to the sonotrode.

According to the invention, the support is temperature-resistant and has a thermal expansion coefficient which is smaller than $10^{-5}/K$.

Because the support is fixed in the carriage, the ultrasonic unit can be easily displaced in the direction towards and away from the workpiece, i.e. in the direction of the main oscillation of the sonotrode or the longitudinal direction of the sonotrode.

In order to ensure a precise guidance of the sonotrode and to be able to reverse the transport direction of the material web, the support supports the sonotrode on both sides and in particular on opposing sides of the sonotrode. In particular, the support supports in the oscillation node of the sonotrode. At this point, an impairment of the sonotrode is minimal.

BRIEF DESCRIPTION OF THE DRAWING

The invention will be explained in detail in the following drawing, wherein.

DETAILED DESCRIPTION OF PREFERRED EMBODIMENTS

Figures 1, 2:
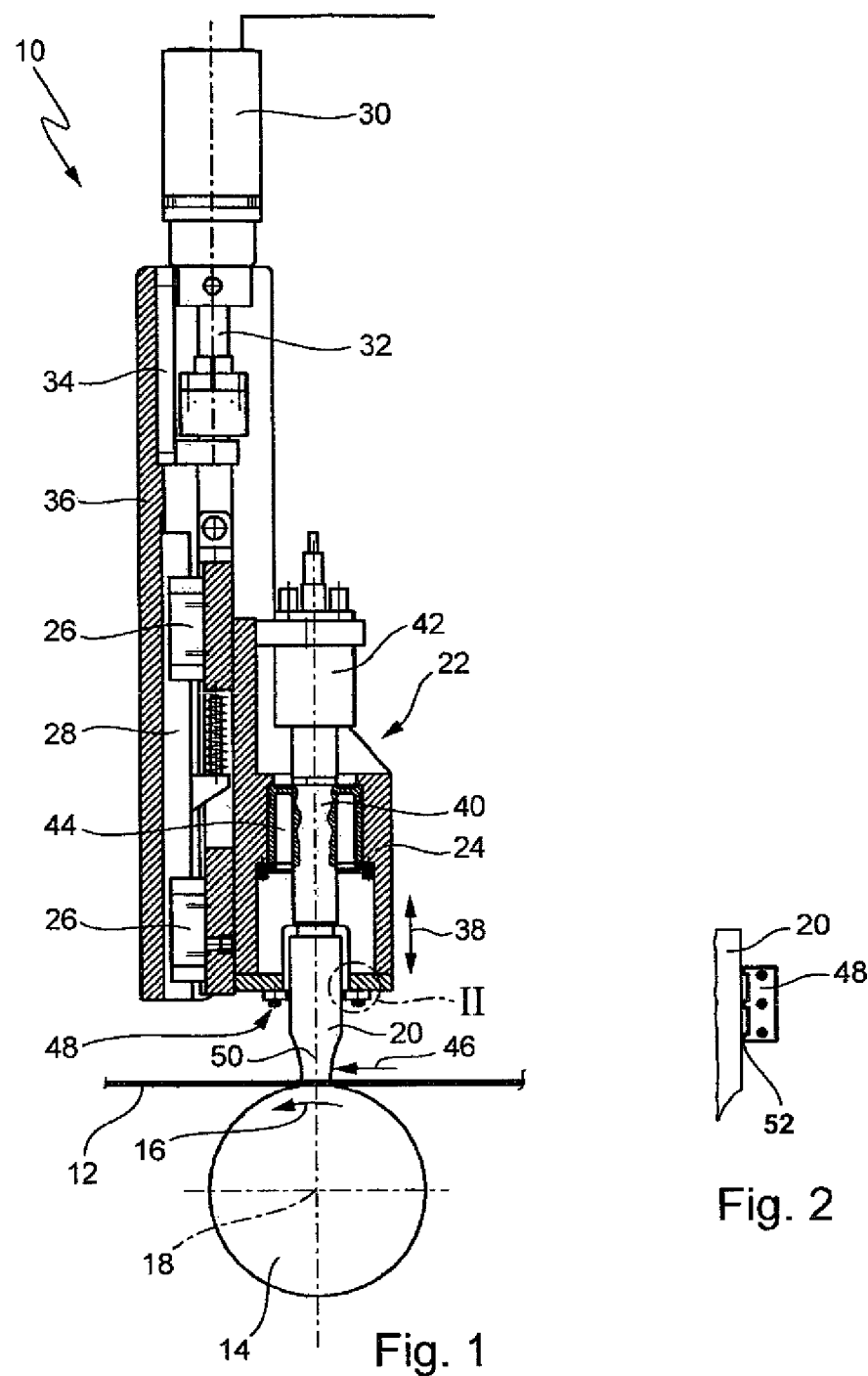
FIG. 1 shows an embodiment of the invention in which the lateral supports rest against the sonotrode.
FIG. 2 shows an enlargement of the section II showing the support according to FIG. 1.

FIG. 1 shows an ultrasonic processing device 10, with which a material web 12 can be processed. For this, the ultrasonic processing device 10 has a counter tool 14 which is configured as a cylinder and is supported for rotation in the direction of the arrow 16 about an axis 18. Further, an ultrasound sonotrode generally designated with 20 is provided and forms part of an ultrasonic unit generally designated with 22. A gap is defined between the counter tool 14 and the sonotrode 20 for passage of the material web 12.

The sonotrode 22 is fixed to a mounting 24 which can be moved towards and away from the counter tool 14 via two carriages which in turn are movably supported on a rail 28. For this, a drive 30 having an output element 32 is provided. The drive 28 is fixed to a mounting frame 36 by a suitable restraining device 34. The output element 32 acts on the mounting 24 via the carriages 26 and causes the displacement of the mounting 24 in the direction of the double arrow 38.

The ultrasonic unit 22 includes additional components. The sonotrode 20 is fixed to an (amplitude transformation member), namely a booster 40, whereas the booster is fixed to a converter 42. The booster 40 and the converter 42 are components of the ultrasonic unit 22. It can clearly be seen that the booster 40 is rigidly mounted on the mounting 24 via a clamping device 44 so that the clamping device 44 carries the ultrasonic unit 22.

When the material web 12 is moved in the direction of the arrow 16 underneath the sonotrode 20 and acted upon with the sonotrode 20 which bears upon the material web 12 with the welding load, then the material web 12 exerts a transverse force in the direction of the arrow 46 on the sonotrode 20. To relieve the site of connection between the sonotrode 20 and the booster 40, two supports 48 are provided to bear laterally on the sonotrode 20, i.e. on side surfaces thereof, and support the sonotrode 20 in transverse direction. Transverse direction relates to the direction which extends perpendicular to the main oscillation direction or longitudinal direction 50. The supports 48 merely rest against the sonotrode 20. They do not fix the sonotrode 20 and they also do not rigidly connect the sonotrode 20 to the mounting 24. The sonotrode 20 is freely movable between the supports 48 in the direction of their longitudinal axes 50. Advantageously, the support 48 supports in the oscillation node of the sonotrode 20.

FIG. 2 shows an enlarged representation of the support 48 which in this embodiment has three webs 52 resting against the sonotrode 20 in a linear fashion. Advantageously, the middle line is located in the oscillation node of the sonotrode 20. This support 48 is constructed as inset piece and can be exchanged for another embodiment in order to support other sonotrodes. This provides the option to support the sonotrode 20 not only linearly but e.g. also punctiform or flatly.

The invention claimed is:

1. A device for processing a material web, comprising:
an ultrasonic unit including a converter, a sonotrode to act on a material web, and a booster to connect the sonotrode to the converter;
a counter tool placed in opposition to the sonotrode to define a gap there between for passage of the material web;
a movable carriage for adjusting a position of the ultrasonic unit in relation to the counter tool, with the booster of the ultrasonic unit being fixedly mounted to the carriage; and
a support respectively provided on both of two opposing sides of the sonotrode for guiding the sonotrode in a longitudinal direction thereof, said support being made of ceramic and having three linearly shaped webs which linearly engage the sonotrode on the two opposing sides, wherein a middle one of the three webs is arranged in an oscillation node of the sonotrode.

2. The device of claim 1, wherein the support supports the sonotrode perpendicular to the longitudinal direction of the sonotrode.

3. The device of claim 1, wherein the support and the sonotrode are moveable relative to one another.

4. The device of claim 1, wherein the support is force-neutral with regard to the sonotrode and prevented from introducing into the sonotrode forces acting in the longitudinal direction of the sonotrode.

5. The device of claim 1, wherein the support is made of a member selected from the group consisting of, invar-alloy, and hardened steel.

6. The device claim 1, wherein the support is temperature-resistant.

7. The device of claim 1, wherein the support has a thermal expansion coefficient, which is smaller than $10^{-5}/K$.

8. The device of claim 1, wherein the support is fixed in or on the carriage.

* * * * *